(12) United States Patent
Broadstone

(10) Patent No.: US 8,056,646 B2
(45) Date of Patent: Nov. 15, 2011

(54) PLANTING TOOL

(76) Inventor: Daniel L. Broadstone, New Albany, IN (US)

( * ) Notice: Subject to any disclaimer, the term of this patent is extended or adjusted under 35 U.S.C. 154(b) by 0 days.

(21) Appl. No.: 12/806,453

(22) Filed: Aug. 12, 2010

(65) Prior Publication Data

US 2011/0061882 A1 Mar. 17, 2011

(51) Int. Cl.
*A01B 1/00* (2006.01)

(52) U.S. Cl. .......................... 172/378; 111/106

(58) Field of Classification Search .......... 111/114–117, 111/89, 98, 92, 99, 106, 107; 172/371–378, 172/21, 22, 379; 294/49, 55.5, 60, 50.5, 294/50.7, 51, 57; 30/276, 277

See application file for complete search history.

(56) References Cited

U.S. PATENT DOCUMENTS

| | | |
|---|---|---|
| 323,419 A | 8/1885 | Hiller |
| 1,183,653 A | 5/1916 | Kring |
| 1,531,100 A | 5/1924 | Howard |
| 1,564,721 A | 12/1925 | Tallon |
| 1,952,585 A | 5/1932 | Crossdale, Jr. |
| 1,893,258 A | 1/1933 | Washburn |
| 2,020,571 A | 11/1935 | Pick |
| 2,207,741 A | 7/1940 | Kimble |
| 2,460,937 A | 2/1949 | Kaufman |
| 3,332,376 A | 7/1967 | Saunoris et al. |
| D211,747 S | 7/1968 | Odell |
| 3,621,920 A | 11/1971 | Brown |
| 3,749,034 A | 7/1973 | Bergius et al. |
| 4,377,919 A | 3/1983 | Gams |
| 4,934,289 A | 6/1990 | Robinson |
| D309,242 S | 7/1990 | Laslo |
| 4,995,327 A | 2/1991 | Jeffers, Sr. |
| 5,109,930 A | 5/1992 | Napier |
| 5,156,101 A | 10/1992 | Wien |
| 5,228,400 A | 7/1993 | Luke |
| D339,038 S | 9/1993 | Pohlmann |
| D346,537 S | 5/1994 | Lefebvre |
| D350,676 S | 9/1994 | Lefkow |
| 5,471,939 A | 12/1995 | Chancey |
| 5,492,070 A | 2/1996 | Lefkow |
| D371,493 S | 7/1996 | Beaulieu |
| 5,709,273 A | 1/1998 | Roth |
| D395,807 S | 7/1998 | Beasley |
| 5,787,990 A | 8/1998 | Miller |
| 5,813,471 A | 9/1998 | Ramsey |
| 5,848,653 A | 12/1998 | Warter |
| D405,328 S | 2/1999 | Bott |
| 5,924,369 A | 7/1999 | Hatcher |
| 6,024,034 A | 2/2000 | Howell |
| 6,047,651 A | 4/2000 | Wilson |

(Continued)

*Primary Examiner* — Robert Pezzuto

(74) *Attorney, Agent, or Firm* — Carrithers Law Office PLLC; David W. Carrithers

(57) ABSTRACT

A device for making holes in the ground for easy insertion and planting of garden plants which are rooted in small containers. The tool has a least one frustro-conical or frustro-pyramidal shaped projection forming a cone extending down projecting downward from a base of a stirrup having a means for attaching a handle defining a cylinder formed at the top of the stirrup. A long handle may project up from the tool body with a large aperture just above the tool body into which the user's foot may be placed to help in pushing the projections into the ground to make holes sized for planting garden plants. The tool body can be connected to the handle rigidly or may swivel if desired. In one embodiment a plurality of frustro-conical shaped projections extend from a tool body. The projections are assembled onto a tool body in such a way that the distance between each of the projections is easy adjustable.

10 Claims, 4 Drawing Sheets

U.S. PATENT DOCUMENTS

| | | |
|---|---|---|
| D423,889 S | 5/2000 | Heffner |
| D434,284 S | 11/2000 | Gracy |
| 6,352,122 B1 | 3/2002 | Love |
| 6,386,294 B1 | 5/2002 | Best |
| 6,662,736 B1 | 12/2003 | Lowe et al. |
| D502,848 S | 3/2005 | Bergmeier |
| 6,892,823 B2 | 5/2005 | Cirella |
| 2003/0127236 A1 | 7/2003 | Wherry |
| 2005/0006111 A1 | 1/2005 | Wherry |
| 2005/0045349 A1 | 3/2005 | Cirella |
| 2005/0167124 A1 | 8/2005 | Rotan et al. |

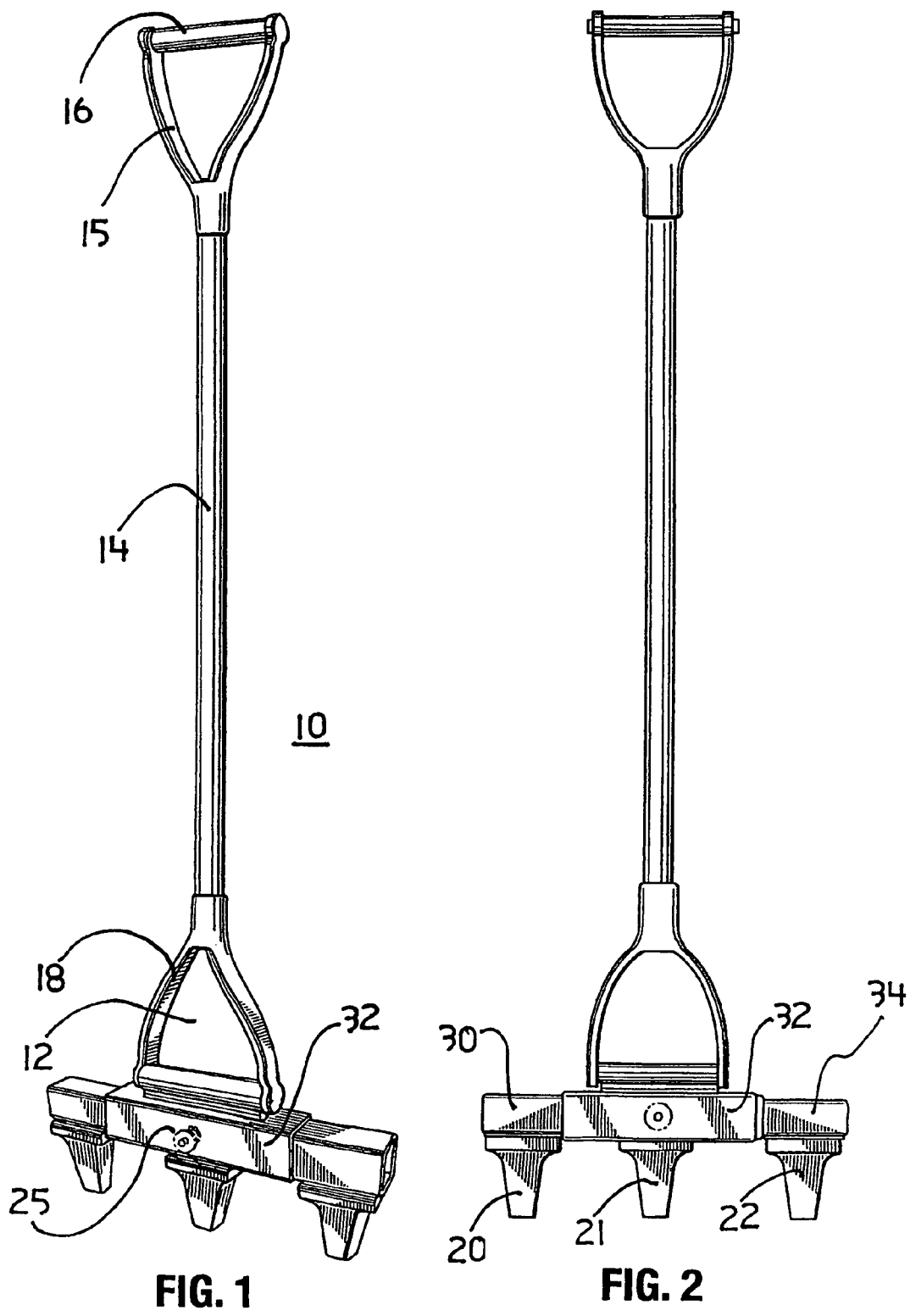

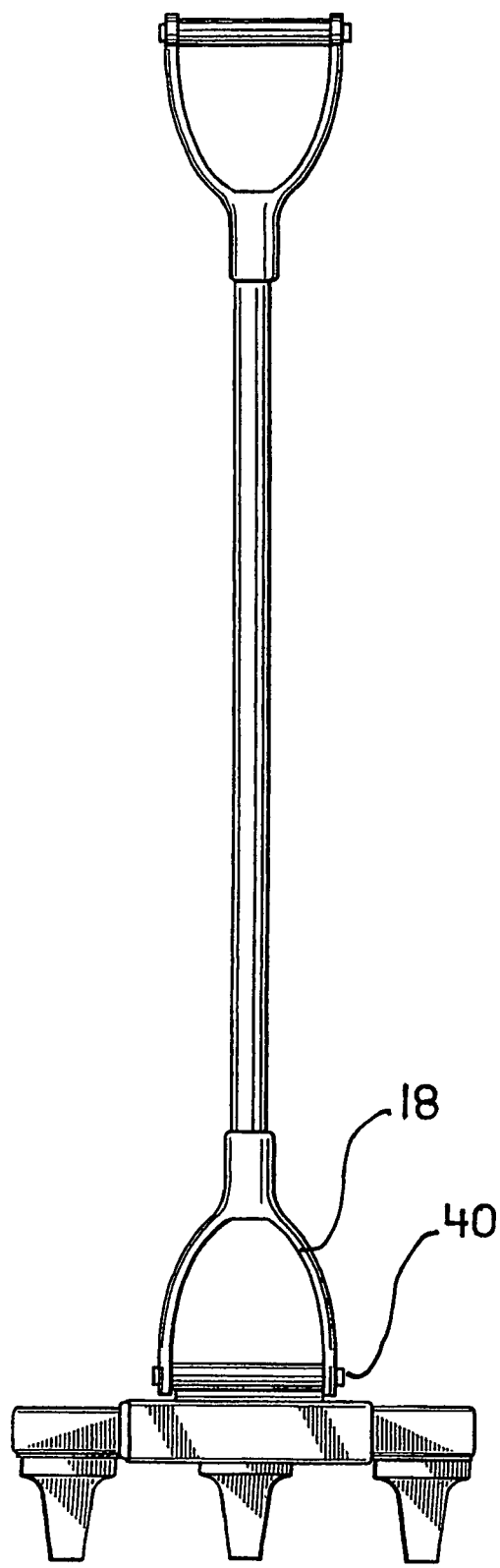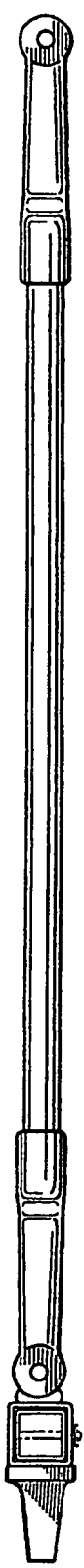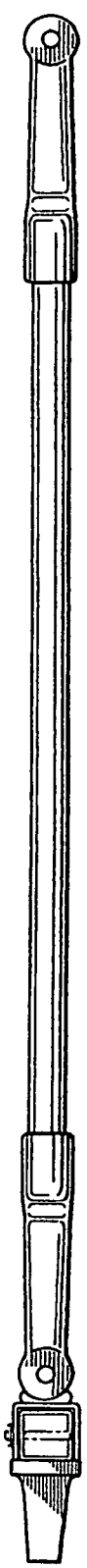
FIG. 3     FIG. 4     FIG. 5

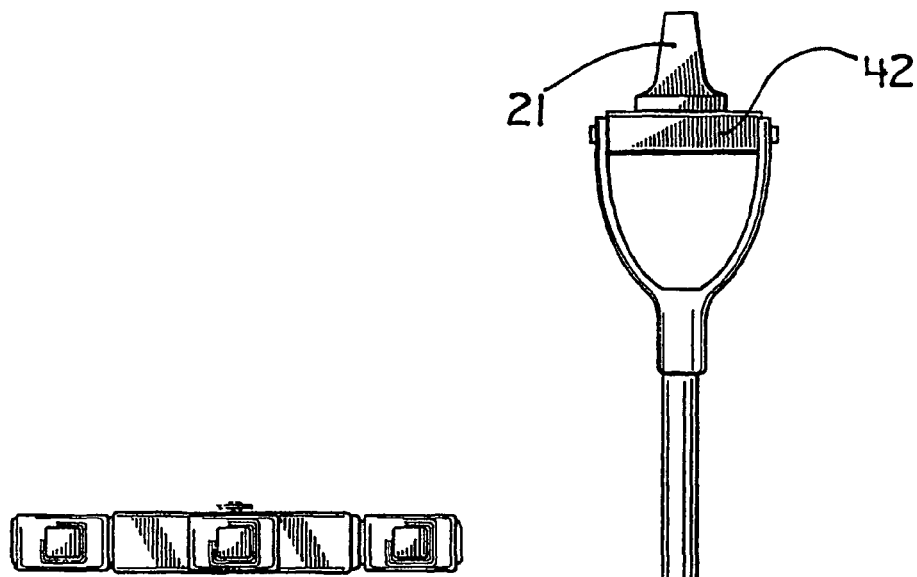
FIG. 6
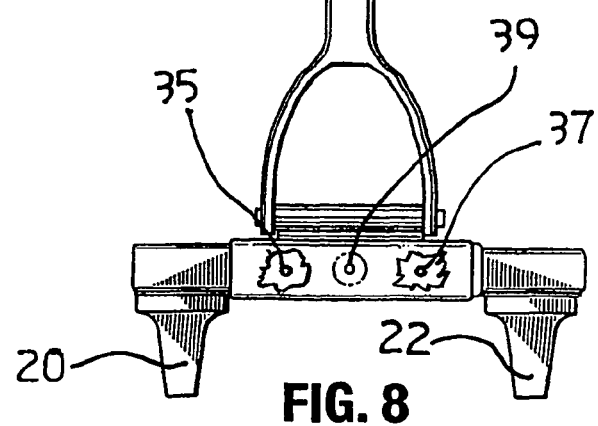
FIG. 7
FIG. 8

PLANTING TOOL

TECHNICAL FIELD

The present invention relates to the field tools used to plants garden plants especially pre-rooted container plants.

DESCRIPTION OF THE RELATED ART

U.S. Pat. No. 5,813,471 by Ramsey for "LAWN AERATOR WITH AN ARRAY OF AERATION POSTS" issued on Sep. 29, 1998 teaches a ground aerator with an array of frustro conical posts defining rows and columns and coupled to the bottom surface of a base plate. A handle is rigidly attached projecting vertically upward from the top surface.

Other hand devices such as a simple curved stick for making a hole in the ground have been used.

BACKGROUND OF THE INVENTION

A tool is needed to make pre-shaped holes in the ground for planting garden plants from trays and in particular for planting garden plants which are purchased pre-tooted in trays referred to as flats from garden stores. When plants are removed from the tray, the dirt generally comes out with the roots and in shaped in a generally pyramidal shape. A tool which makes a hole in the ground corresponding in shape with the root ball of the plant is desirable to minimize disturbance of the soil in close planting environments, to minimize bending over and back strain, to exert sufficient pressure on the soil to produce the desired depression depth, and to minimize the mess caused by digging holes with spades, shovels or trowels whereby loose dirt is spread over mulch, or other ground covering. Further, a tool which can make three or more holes at a desired spacing is handy. The projections which make these holes should be easily adjustable so that spacing can be changed as desired.

Ramsey teaches a tool which makes conical holes spaced apart in a fixed array. Ramsey does not produce pyramidal holes and the projections are not adjustable with respect to one another. Further, Ramsey's tool does not provide a spot for a user's foot when more force is needed to press the tool into the ground.

SUMMARY OF THE INVENTION

One preferred embodiment comprises, consists essentially of, and/or consists of a device for making holes in the ground for easy insertion and planting of garden plants which are rooted in small containers. The tool has a least one frustro-conical or frustro-pyramidal shaped projection forming a cone extending down projecting downward from a base of a stirrup having a means for attaching a handle defining a cylinder formed at the top of the stirrup. A long handle may project up from the tool body with a large aperture just above the tool body into which the user's foot may be placed to help in pushing the projections into the ground to make holes sized for planting garden plants. The tool body can be connected to the handle rigidly or may swivel if desired.

Another preferred embodiment comprises, consists essentially of, and/or consists of a planting tool having a tubular tool body having a first tubular housing, a first yoke attached to a top surface of said tool body, said first yoke and said tool body forming an aperture into which a user's foot may be placed to put downward pressure on said tool body, a shaft portion forming a handle portion connected to a top end of said first yoke, a second yoke attached to a top end of said shaft portion, a handle connected to and bridging a gap formed by the two ends of said second yoke, a second tubular housing slidably inserted into and extending outside said tool body, said second tubular housing having a first frusto-pyramidal projection extending downward from a portion of said second tubular housing extending outside said tool body and said second housing held within said tool body by a pin, a third tubular housing slidably inserted into and extending outside said tool body and said second tubular housing, said third tubular housing having a second frusto-pyramidal projection extending downward from a portion of said third tubular housing extending outside said tool body and said second tubular housing, and said third tubular housing held within said tool body and said second housing by said pin, and a third frusto-pyramidal projection extending downward from said tool body and held within said tool body by said pin.

It is an object of this invention to provide a tool which can make holes in the ground for easy transplanting of garden plants, especially pre-rooted plants which are available in trays or flats.

It is an object of this invention to provide a tool which has at least three frustro-pyramidal or frusto-conical protections extending vertically downward to be pressed into the soil to leave holes shaped perfectly for transplanting pre-rooted plants from trays or flats.

It is an object of this invention to provide a tool where the at least three projections are slidably adjustable to allow a user to set the spacing for planting.

It is an object of this invention to provide a tool which contains a handle projecting vertically upward and forming a hole into which a user can place his foot to help press the tool into the soil.

It is an object of this invention to provide a tool which contains a handle long enough so that a user can make holes for planting without bending down.

BRIEF DESCRIPTION OF THE DRAWINGS

A better understanding of the present invention will be had upon reference to the following description in conjunction with the accompanying drawings in which like numerals refer to like parts throughout the views wherein:

FIG. 1 is a perspective view of the planting tool.

FIG. 2 is a front view of the planting tool.

FIG. 3 is a rear view of an alternate embodiment of the planting tool.

FIG. 4 is a left hand view of the planting tool in FIG. 1.

FIG. 5 is a right hand view of the planting tool in FIG. 1.

FIG. 6 is a view showing bottom of the frusto-pyramidal projections.

FIG. 7 is a top view of the planting tool.

FIG. 8 is a front view of a further embodiment of the planting tool.

DESCRIPTION OF THE PREFERRED EMBODIMENTS

Figure 9:
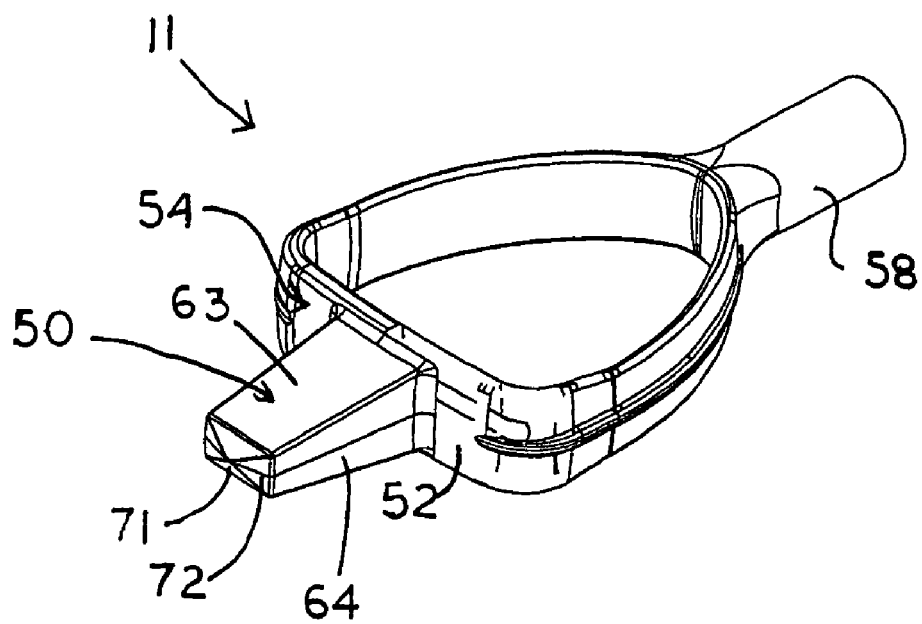
FIG. 9 is a perspective view of an alternate embodiment of the planting tool having a single projection cone.

In accordance with the present invention, there is provided a tool for making holes in the ground for transplanting garden plants, especially plants that are provided in containers known as trays or flats. When these plants are removed form a tray, the soil on the roots in is the shape of an inverted pyramid or a truncated inverted pyramid referred to herein as a frusto-pyramid where part of the bottom end of the inverted pyramid is removed leaving a somewhat flattened bottom.

FIG. 1 shows a tool body base 32 onto which three inverted frusto-pyramidal projections 20, 21 and 22 are connected. Yoke 18 is rigidly connected to tool body base 32 and to handle portion 14. Yoke 15 connects handle 16 to the top end of handle portion 14. Yoke 18 and tool body base 32 form an aperture or loop 12 into which a user can put his foot to apply more downward force on the tool.

A frusto-pyramid or projection cone 20 is rigidly connected to tubular section 30 which is slidably held within the longitudinal tool body base 32, which is also tubular and coaxial in construction. Likewise, frusto-pyramid 22 is rigidly connected to tubular section 34, which is slidably held within tubular section 30. Pin 25 holds pyramid 21 and tubes 30 and 34 within tool body base 32 at a selected position by cooperatively engaging spaced apart apertures or holes 25, 27, 29 there through and may be removed to allow disassembly or adjustment of the positioning of tubes 30 and 34 to allow pyramids 20, 21 and 22 to be closer to one another or further apart. Tool body base 32 and coaxial sliding tube 34 are provided with a plurality apertures, for example apertures 35 and 37, which may be aligned with aperture 39 to receive pin 25 and thus allow different displacements of pyramids 20, 21, and 22 with respect to one another.

An alternate embodiment is shown in FIG. 3 wherein yoke 18 is rotatably connected to tool body base 32 by means of pin 40. It is anticipated that yoke 18 may be rotated with respect to tool body base 32 but rotation would be limited and would be stiff such that the head would not wobble freely but could be adjusted for a different angle if desired.

Another embodiment in FIG. 8 shows a modified handle 42 which can receive and hold pyramid 21 to allow individual holes to be made in the ground while holding the tool upside down. Further, this allows for even broader gaps between holes made by pyramids 20 and 22.

It is anticipated that the tool body 32 and the tubes 30 and 34 may be made from box tubing or round tubing or any other cross-sectional shape that would be applicable.

Moreover, it is anticipated that the projection cones 20, 21, 22 can be formed of a selected first size and that additional larger hollow cones (not shown) could be nested with the cones 20, 21, 22. Thus, several sized cones could be attached to base cones and nested together whereby the small base cones provide structural support and a frame so that the overlapping larger cones could be attached by a friction fit, snap fit, or held in place by a tab or projection extending there through providing means for an variety of different holes sizes.

Figure 10:
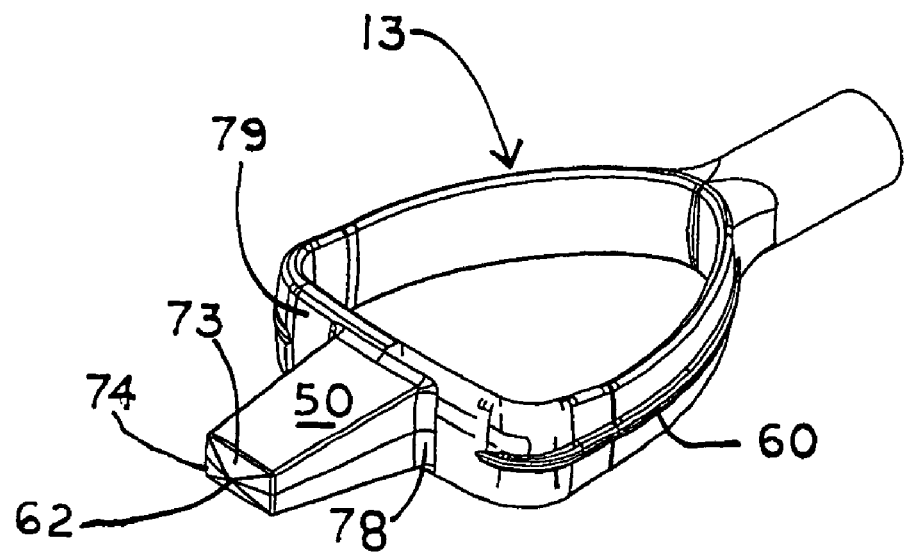
FIG. 10 is a perspective view of the alternate embodiment of FIG. 9 showing a reinforcement rib extending around the stirrup body.

Furthermore as shown in FIG. 9, an alternate planting tool 11 has a single frustro-conical or frustro-pyramidal shaped projection or cone 50 extending or projecting downward from a bottom surface 52 of a base 54 of a stirrup 56 having a means for attaching a handle 14 defining a cylinder or sleeve 58 formed at the top of the stirrup 56. It is anticipated that one or more strips of material could be utilized in place of the cylinder 58 to attach to the handle 14. The means of attaching the handle is preferably integrally formed with the stirrup 56 and the cone 50. The stirrup 56 is sized to accommodate the user's foot which may be placed therein to push the cone 50 into the ground to make holes sized for planting garden plants. The tool body can be connected to the handle rigidly or may swivel if desired. As shown in FIG. 10, a reinforcing rib 60 may extend around the exterior body of the stirrup 56 of the planting tool 13. One preferred embodiment of the cone 50 is generally hollow having cross-sectional support strips of material disposed therein extending longitudinally within the cone 50 to provide strength and reduce weight.

More particularly the embodiments shown in FIGS. 8 and 9 define a stirrup 56 which includes rounded corners and a frustro-pyramidal shaped cone 50 having sides 63, 64, (65 and 66) not shown, and a tip 62 formed by triangular surfaces on all four sides 71, 72, 73, and 74, converging at an obtuse angle to form a blunt point 75. Furthermore, the intersection of the cone 50 with the bottom surface 76 of the stirrup 56 defines a beveled ring 78 extending around the base 79 of the cone 50. The blunt point 62 and beveled ring 78 aid in release of the planting tool 11 from the soil in a clean manner so that mud and debris do not tend to stick thereto as is often the case with shapely defined projections.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. An planting tool comprising:
   a tubular tool body comprising a first tubular housing;
   a first yoke attached to a top surface of said tool body, said first yoke and said tool body forming an aperture into which a user's foot may be placed to put downward pressure on said tool body;
   a shaft portion forming a handle portion connected to a top end of said first yoke;
   a second yoke attached to a top end of said shaft portion;
   a handle connected to and bridging a gap formed by the two ends of said second yoke;
   a second tubular housing slidably inserted into and extending outside said tool body, said second tubular housing having a first frusto-pyramidal projection extending downward from a portion of said second tubular housing extending outside said tool body and said second housing held within said tool body by a pin;
   a third tubular housing slidably inserted into and extending outside said tool body and said second tubular housing, said third tubular housing having a second frusto-pyramidal projection extending downward from a portion of said third tubular housing extending outside said tool body and said second tubular housing, and said third tubular housing held within said tool body and said second housing by said pin; and
   a third frusto-pyramidal projection extending downward from said tool body and held within said tool body by said pin.

2. The planting tool of claim 1 wherein said first yoke is rigidly attached to said head piece.

3. The planting tool of claim 1 wherein said first yoke is tightly rotatably attached to said head so that said tool body may be rotated but does not wobble freely.

4. The planting tool of claim 1 wherein a plurality of apertures are formed within said first and said second tubular housings for alignment and pinning with an aperture in said tool body, allowing repositioning of said first and said second tubular housings with respect to said tool body and therefore allowing variable gaps between said frusto-pyramidal projections.

5. The planting tool of claim 1 wherein said handle connected to and bridging a gap formed by the two ends of said second yoke is capable of receiving and having fixed thereon said third frusto-pyramidal projection, for the purpose of inverting said planting tool and making single holes in the ground.

6. The planting tool of claim 5 wherein said planting tool is re-inverted to make two hole in the ground which are spaced further apart than with the tool wherein said third frusto-pyramidal projection is connected to said tool body.

7. The planting tool of claim 1 wherein said first, second and third frusto-pyramidal projections are replaced with frusto-conical sections.

8. The planting tool of claim 1 wherein said tool body, said second tubular housing and said third tubular housing comprise box tubing.

9. The planting tool of claim 1 wherein said tool body, said second tubular housing and said third tubular housing comprise round tubing.

10. A planting tool consisting of:
an elongated handle connecting to an elongated cylindrical neck of a tool body having a pair of opposing elongated spaced apart side members defining a yoke, said tool body including a generally flat longitudinal base member connecting to a distal end of each one of said elongated side members defining a base plate and forming an aperture between said pair of opposing elongated side members for placement of a user's foot for exerting downward pressure on said tool body:

a single frustro-conical pyramidal shaped tapered cone consisting of four adjacent side surfaces extending downward from a bottom surface of said base plate of said tool body;

said single frustro-pyramidal shaped tapered cone including a tip consisting of converging triangular surfaces extending from a distal end of each one of said four adjacent side surfaces converging at an obtuse angle to form a point; and a beveled ring extending around a base of said single frustro-conical pyramidal shaped cone at the intersection of said bottom surface of said base plate of said stirrup.

* * * * *